Figure 1:
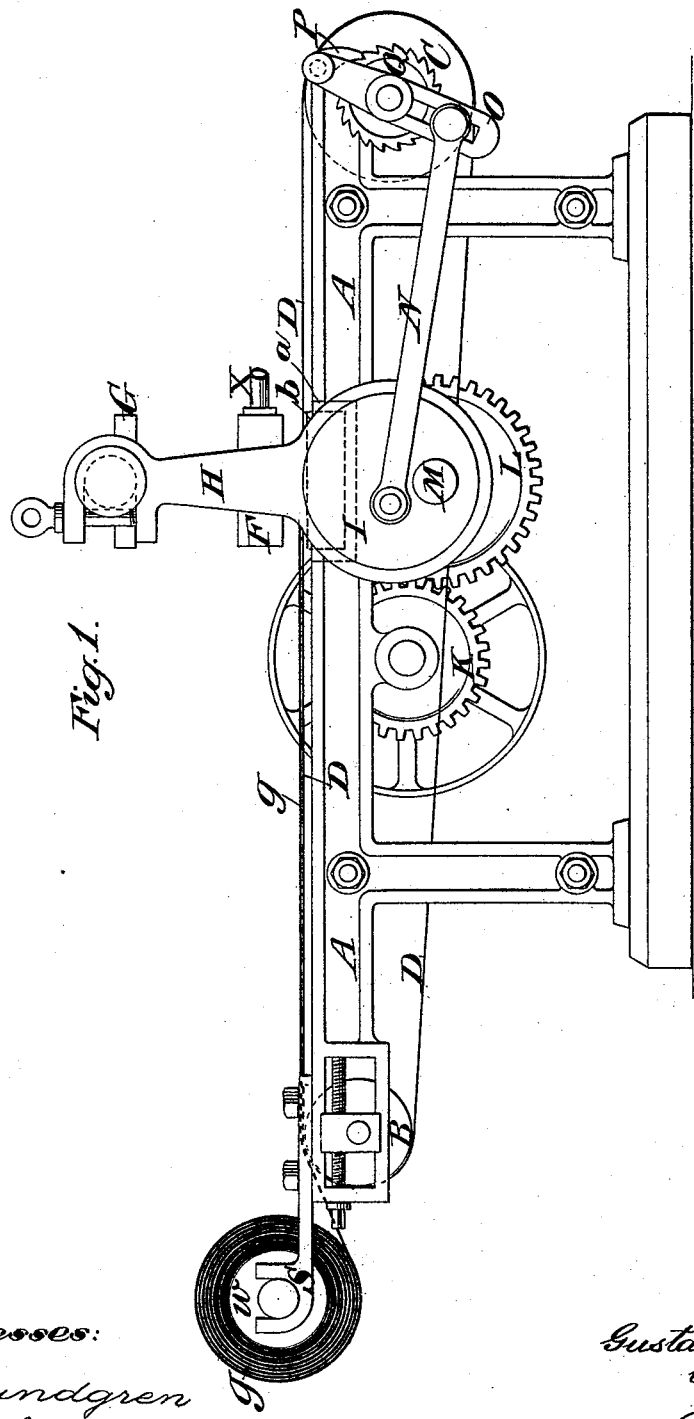

(No Model.) 4 Sheets—Sheet 1.

G. L. HILLE.
MACHINE FOR CUTTING CAOUTCHOUC SHEETS.

No. 490,824. Patented Jan. 31, 1893.

Witnesses:
C. I. Sundgren
D. H. Nayrod

Inventor
Gustav Louis Hille
by attorneys
Brown & Seward

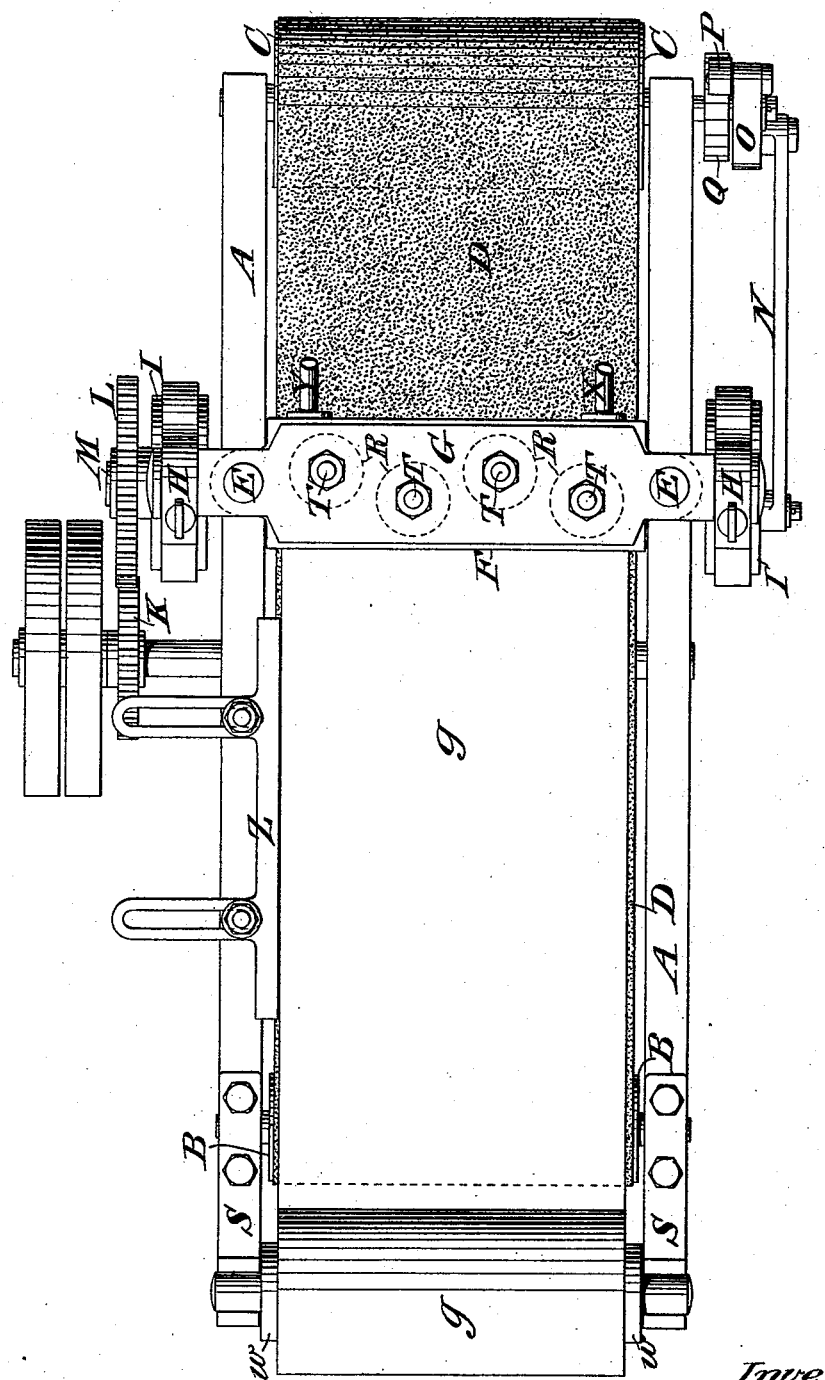

(No Model.)   4 Sheets—Sheet 3.
G. L. HILLE.
MACHINE FOR CUTTING CAOUTCHOUC SHEETS.
No. 490,824. Patented Jan. 31, 1893.
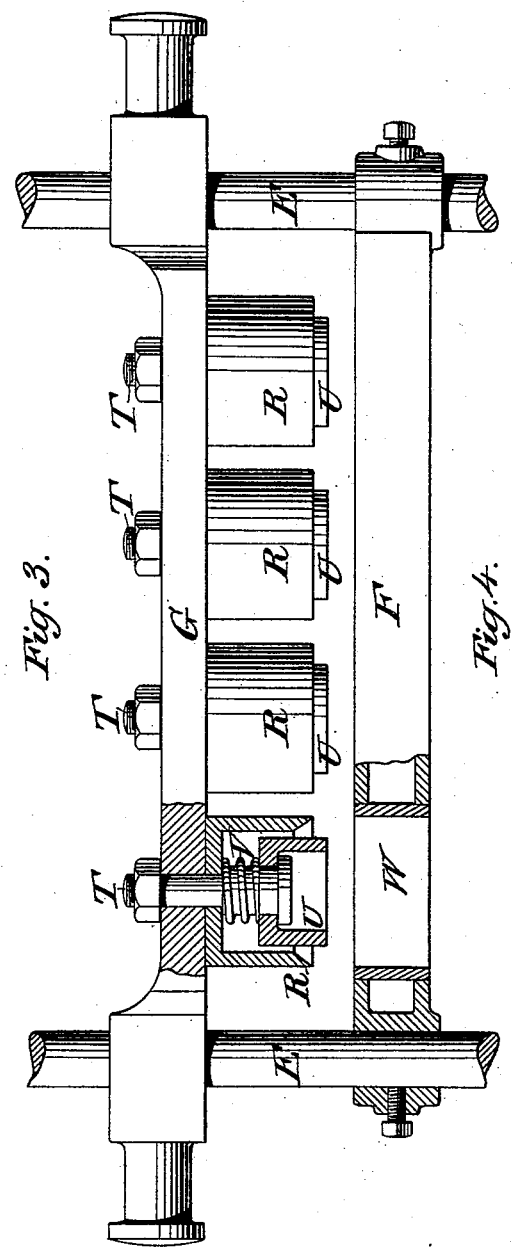
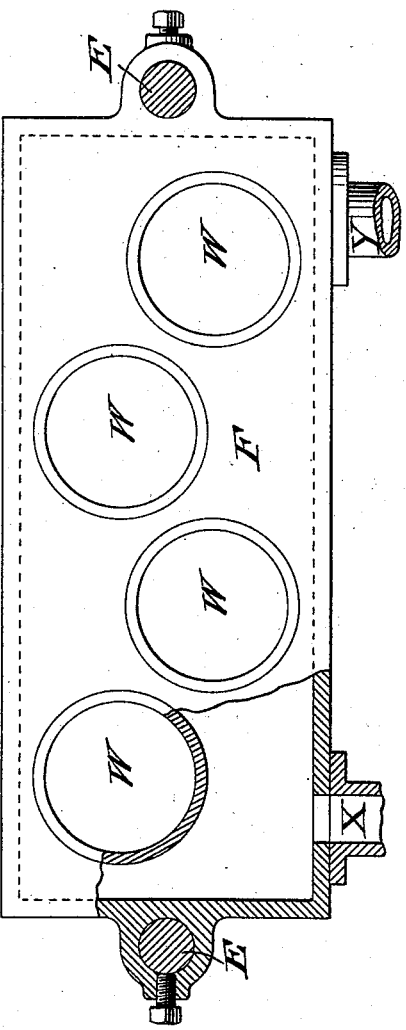

(No Model.) 4 Sheets—Sheet 4.
G. L. HILLE.
MACHINE FOR CUTTING CAOUTCHOUC SHEETS.
No. 490,824. Patented Jan. 31, 1893.
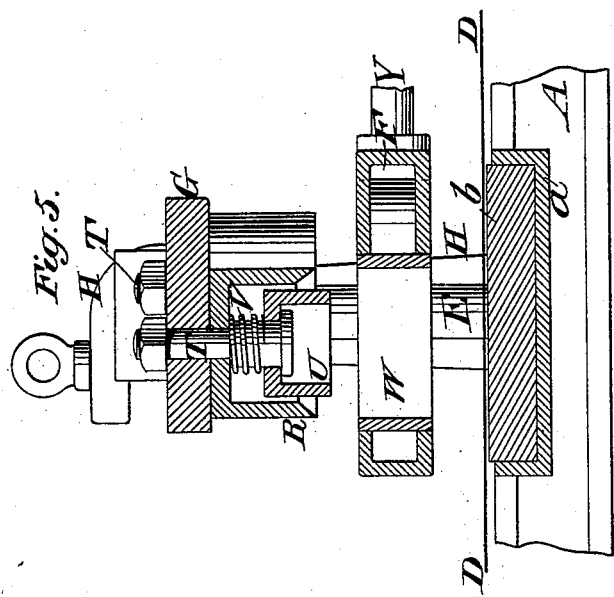
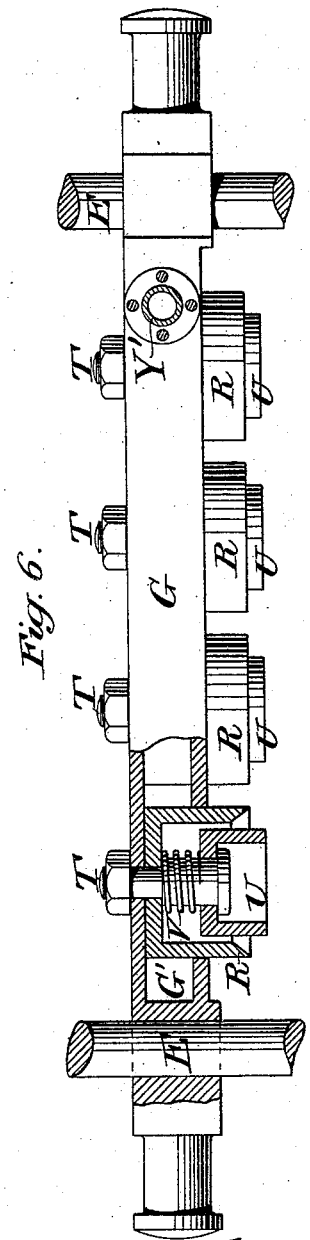
Witnesses:
Inventor:
Gustav Louis Hille
by attorneys

UNITED STATES PATENT OFFICE.

GUSTAV LOUIS HILLE, OF BOLTON, ENGLAND.

MACHINE FOR CUTTING CAOUTCHOUC SHEETS.

SPECIFICATION forming part of Letters Patent No. 490,824, dated January 31, 1893.

Application filed August 24, 1892. Serial No. 444,002. (No model.)

*To all whom it may concern:*

Be it known that I, GUSTAV LOUIS HILLE, a subject of the Queen of Great Britain, resident at Bolton, England, have invented new and useful Improvements in Machines for Cutting Caoutchouc Sheets, of which the following is a specification.

My invention relates to machines for cutting caoutchouc sheets into circular or other shaped pieces with beveled edges or otherwise, by means of metal cutters heated by steam or gas. The cutters may for this purpose be heated either by being made to pass through a fixed chest or chamber heated by steam or other medium or by being affixed to a movable beam which is made hollow to constitute a chest or chamber and connected by a flexible or jointed pipe to a steam boiler, the said chest or chamber in either case being made to surround the cutters during their movement.

Figure 1 is a side view and Fig. 2 a plan of a machine embodying my invention in which the cutters are heated by causing them to pass through openings in a fixed steam heated chest or chamber. Fig. 3 represents a front view partly in section of the cutter beam and attached cutters and the steam chamber for heating them. Fig. 4 represents a plan view of the steam chest or chamber partly in section. Fig. 5 represents a vertical section parallel with Fig. 1, of the cutter beam, cutters and steam chest and of a transverse beam upon which the cutting is performed. Fig. 6 is a front view partly in section representing the hollow construction of the cutter beam whereby it is made to constitute a steam chest for heating the cutters. Figs. 3, 4, 5 and 6 are on a larger scale than Figs. 1 and 2.

I will first describe the machine illustrated in Figs. 1 to 5.

At each end of the framing A are mounted rollers B and C, over which is stretched an endless apron D. At a convenient point of the framing A, are mounted two opposite uprights E to which is fixed the steam chest F and which in addition serve as guides to the vertically reciprocating beam G which is represented as solid carrying the cutters R. The beam G receives its reciprocating motion by means of eccentrics I and their rods H, the eccentrics being fixed on a shaft M driven by toothed gearing K L from the driving shaft. One eccentric I carries a crank-pin which is connected by a rod N to the tail of a lever O mounted loose on the end of the shaft of the roller C, which lever carries a pawl P gearing with a ratchet wheel fixed on the roller shaft. Thus on the rotation of the eccentric I, the roller C receives a step by step rotary motion through the rod N, lever O, pawl P and ratchet wheel Q, thereby producing a step by step traveling motion of the apron D. At one end of the framing A are brackets S in which is carried a roller $w$ on which is coiled the uncured caoutchouc sheet $g$. As shown in Fig. 3, the cutters are fixed to the solid beam G by means of screws T. For ejecting from the cutters the disks of caoutchouc cut out of the sheet an ejector U is provided within the cutter which is by preference pressed downward by means of springs V. In this machine having the solid cutter beam the heating of the cutters is effected by means of the steam chest F before mentioned affixed on the uprights E. This chest has as shown in Figs. 4 and 5, vertical openings W formed through it through which the cutters R are made to pass before they effect the cutting. The circulation of steam through the steam chest F is effected by means of pipes X Y leading to a steam boiler. At one side of the machine framing A is an adjustable guide bar Z for accurately guiding the caoutchouc sheet to the cutters.

The action of the above described machine is as follows: The front end of the caoutchouc sheet $g$ coiled on the roller $w$ which revolves freely in the brackets S, is placed upon the traveling apron D and the machine is then started. The cutter beam G is thereby made to move vertically up and down the cutters thus being made to pass through the openings W in the steam chest F so as to become heated thereby. The traveling apron D at the same time receives a step by step forward motion causing the caoutchouc sheet $g$ to be unwound from the roller $w$ and to travel forward with it so that on arriving beneath the steam chest F it is acted upon by the descending cutters R which cut correspondingly shaped disks out of it. On the upward motion of the cutters the ejectors U eject the disks from the cutters causing them to fall back on the apron D which carries them to the end of the machine where they drop off. The step by step motion of the apron D is so arranged relatively to the motion of the cutters that it remains stationary when these are acting upon it. For affording support to the caoutchouc sheet while the cutters R are acting thereon, a transverse beam or support $a$ covered with a soft material $b$ is arranged, as shown in Fig. 5, underneath the traveling apron D and immediately below the steam chest F. This beam is also shown in dotted outline in Fig. 1.

All the change in the machine necessary to effect the heating of the cutters directly through the cutter beam G is to make said beam hollow, as shown in Fig. 6, where the beam is represented partly in section, so that it constitutes a steam chest G' in which the cutters are surrounded by steam, and to connect this cutter beam with a steam boiler by a pipe or pipes Y', the said pipe or pipes being of flexible material or made with flexible connections to permit the ascent or descent of the cutter beam and cutters. When the cutter beam is thus constructed to constitute a heating chest or chamber for the cutters, the chamber F before described may be dispensed with.

The traveling apron may in some cases be dispensed with and the caoutchouc sheet or strips be placed by hand beneath the cutters. These are made of any configuration corresponding to that of the caoutchouc disk to be cut. When caoutchouc rings are to be cut, the cutters are formed with two or more concentric circular cutting edges. For cutting the disks with a beveled edge the cutting edges of the cutters are beveled outward as shown; for cutting a straight edge the cutting edges are beveled inward.

What I claim as my invention and desire to secure by Letters Patent is:

In a machine for cutting caoutchouc sheets, the combination with the cutters of a surrounding heating chest or chamber, substantially as herein described.

In testimony whereof I have signed my name to this specification in the presence of two subscribing witnesses.

GUSTAV LOUIS HILLE.

Witnesses:
HAROLD REDMAYNE TRISTRAM,
CHARLES BRUETON.